(12) United States Patent
Mio et al.

(10) Patent No.: US 9,825,298 B2
(45) Date of Patent: Nov. 21, 2017

(54) APPARATUS AND METHOD FOR MANUFACTURING AN ELECTRICITY STORAGE MATERIAL

(71) Applicant: JTEKT CORPORATION, Osaka-shi (JP)

(72) Inventors: Takumi Mio, Kariya (JP); Yoshifumi Fukaya, Obu (JP); Takafumi Fujii, Okazaki (JP)

(73) Assignee: JTEKT CORPORATION, Osaka-shi (JP)

( * ) Notice: Subject to any disclaimer, the term of this patent is extended or adjusted under 35 U.S.C. 154(b) by 44 days.

(21) Appl. No.: 14/584,251

(22) Filed: Dec. 29, 2014

(65) Prior Publication Data

US 2015/0200396 A1 Jul. 16, 2015

(30) Foreign Application Priority Data

Jan. 14, 2014 (JP) ................................ 2014-004406

(51) Int. Cl.
*H01M 4/62* (2006.01)
*B01F 15/00* (2006.01)
(Continued)

(52) U.S. Cl.
CPC ............. *H01M 4/62* (2013.01); *B01F 1/0038* (2013.01); *B01F 11/02* (2013.01);
(Continued)

(58) Field of Classification Search
None
See application file for complete search history.

(56) References Cited

U.S. PATENT DOCUMENTS

2005/0231785 A1* 10/2005 Oh .......................... B24B 37/04
359/265
2006/0153972 A1* 7/2006 Hirokawa .............. H01G 9/058
427/79

(Continued)

FOREIGN PATENT DOCUMENTS

DE 20 2010 011 902 U1 12/2010
JP 2001-264277 9/2001
JP 2009-239271 10/2009

OTHER PUBLICATIONS

Copending U.S. Appl. No. 14/851,264 and U.S. Appl. No. 14/172,299, cited in the Obviousness-type Double Patenting rejection.*

(Continued)

*Primary Examiner* — Katie L Hammer
(74) *Attorney, Agent, or Firm* — Oblon, McClelland, Maier & Neustadt, L.L.P.

(57) ABSTRACT

An apparatus and method for manufacturing an electricity storage material are provided which allow easily measuring the dissolution rate to solubility of a solution of a powder thickener dissolved in a liquid solvent. An apparatus for manufacturing an electricity storage material includes: a dissolving device that dissolves in a liquid solvent a thickener as powder that is ionized when dissolved; and a dissolution-rate-to-solubility determining device that measures conductivity of the solution produced by the dissolving device and determines a dissolution rate to solubility of the solution based on the measured conductivity. The dissolution rate to solubility can thus be determined without the need to stop the dissolving device during dissolution of the thickener in the liquid solvent. This can significantly improve production efficiency. Since excessive operation of the dissolving device can be prevented, energy saving can be achieved.

8 Claims, 6 Drawing Sheets

(51) Int. Cl.
B01F 11/02 (2006.01)
B01F 1/00 (2006.01)
H01M 4/04 (2006.01)
H01M 4/139 (2010.01)

(52) U.S. Cl.
CPC .... B01F 11/0291 (2013.01); B01F 15/00227 (2013.01); B01F 15/00246 (2013.01); B01F 15/00253 (2013.01); H01M 4/04 (2013.01); H01M 4/139 (2013.01); B01F 2215/0098 (2013.01); Y02P 70/54 (2015.11)

(56) References Cited

U.S. PATENT DOCUMENTS

| | | |
|---|---|---|
| 2011/0305648 A1 | 12/2011 | Knapek et al. |
| 2012/0295159 A1 | 11/2012 | Kobayashi |
| 2013/0202781 A1 | 8/2013 | Kobayashi |
| 2013/0315030 A1* | 11/2013 | Ishida .................. B01F 3/1221 366/153.3 |

OTHER PUBLICATIONS

U.S. Appl. No. 14/851,264, filed Sep. 11, 2015, Mio, et al.
Extended European Search Report dated Jun. 5, 2015 in Patent Application No. 15150761.3.

* cited by examiner

APPARATUS AND METHOD FOR MANUFACTURING AN ELECTRICITY STORAGE MATERIAL

INCORPORATION BY REFERENCE

The disclosure of Japanese Patent Application No. 2014-004406 filed on Jan. 14, 2014 including the specification, drawings and abstract, is incorporated herein by reference in its entirety.

BACKGROUND OF THE INVENTION

1. Field of the Invention

The invention relates to an apparatus and a method for manufacturing an electricity storage material.

2. Description of Related Art

In recent years, lithium ion secondary batteries have been used for hybrid vehicles, electric vehicles, etc. Electrodes of the lithium ion secondary batteries are manufactured by first kneading powder of an active material etc. and a solution of a thickener to produce slurry of an active material (electricity storage material), and then applying the slurry to a base material such as aluminum foil and drying the slurry. Japanese Patent Application Publication No. 2011-113821 (JP 2011-113821 A) describes a method for predicting battery performance by measuring a change in impedance of slurry of an active material with time in the step of drying the slurry, and analyzing an aggregation process of particles dispersed in the slurry. Satisfactory battery performance is obtained in the case where the impedance of the slurry decreases monotonically.

How much a powder thickener has been dissolved in a liquid solvent is important to the battery performance. The rate of the mass of solute dissolved in a certain amount of solvent to solubility (the maximum mass of solute that can be dissolved in the solvent) is herein referred to as the "dissolution rate to solubility." In order to obtain satisfactory battery performance, it is necessary to use a solution of a powder thickener dissolved in a liquid solvent at a dissolution rate to solubility of, e.g., 80% or more. A conventional kneading step requires time and effort as a kneading device is stopped during kneading to take out the solution, and viscosity of the solution is measured to determine the dissolution rate to solubility.

SUMMARY OF THE INVENTION

It is an object of the invention to provide an apparatus and a method for manufacturing an electricity storage material, which allow easily measuring the dissolution rate to solubility of a solution of a powder thickener dissolved in a liquid solvent.

According to an aspect of the invention, an apparatus for manufacturing an electricity storage material containing at least a thickener and an active material includes: a dissolving device that dissolves in a liquid solvent the thickener as powder that is ionized when dissolved; and a dissolution-rate-to-solubility determining device that measures conductivity of the solution of the thickener dissolved by the dissolving device and determines a dissolution rate to solubility of the solution of the thickener based on the measured conductivity. The dissolution rate to solubility of the solution of the thickener can thus be determined without the need to stop the dissolving device during dissolution of the thickener in the liquid solvent. This can significantly improve production efficiency.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

An embodiment of the invention will be described below with reference to the accompanying drawings. The rate of the mass of solute dissolved in a certain amount of solvent to solubility (the maximum mass of solute that can be dissolved in the solvent) is herein referred to as the "dissolution rate to solubility."

First, an electricity storage material that is manufactured by a manufacturing apparatus will be described. An apparatus for manufacturing an electricity storage material according to the present embodiment forms, e.g., is one of apparatuses for manufacturing electrodes (positive and negative electrodes) of lithium ion secondary batteries. Electrodes of lithium ion secondary batteries are manufactured by applying slurry of an active material as an electricity storage material to a base material such as aluminum foil or copper foil and drying the slurry. The apparatus for manufacturing an electricity storage material according to the present embodiment is an apparatus for manufacturing slurry of an active material.

For positive electrodes, specific examples of the active material include lithium-nickel oxide etc. as an active material (solid component), N-methylpyrrolidone etc. as a solvent (liquid component), acetylene black etc. as a conductive agent, and polyvinylidene fluoride etc. as a binder. For negative electrodes, specific examples of the active material include graphite etc. as an active material (solid component), water as a solvent (liquid component), carboxymethyl cellulose etc. as a thickener, and SRB rubber, polyacrylic acid, etc. as a binder.

Figure 1:
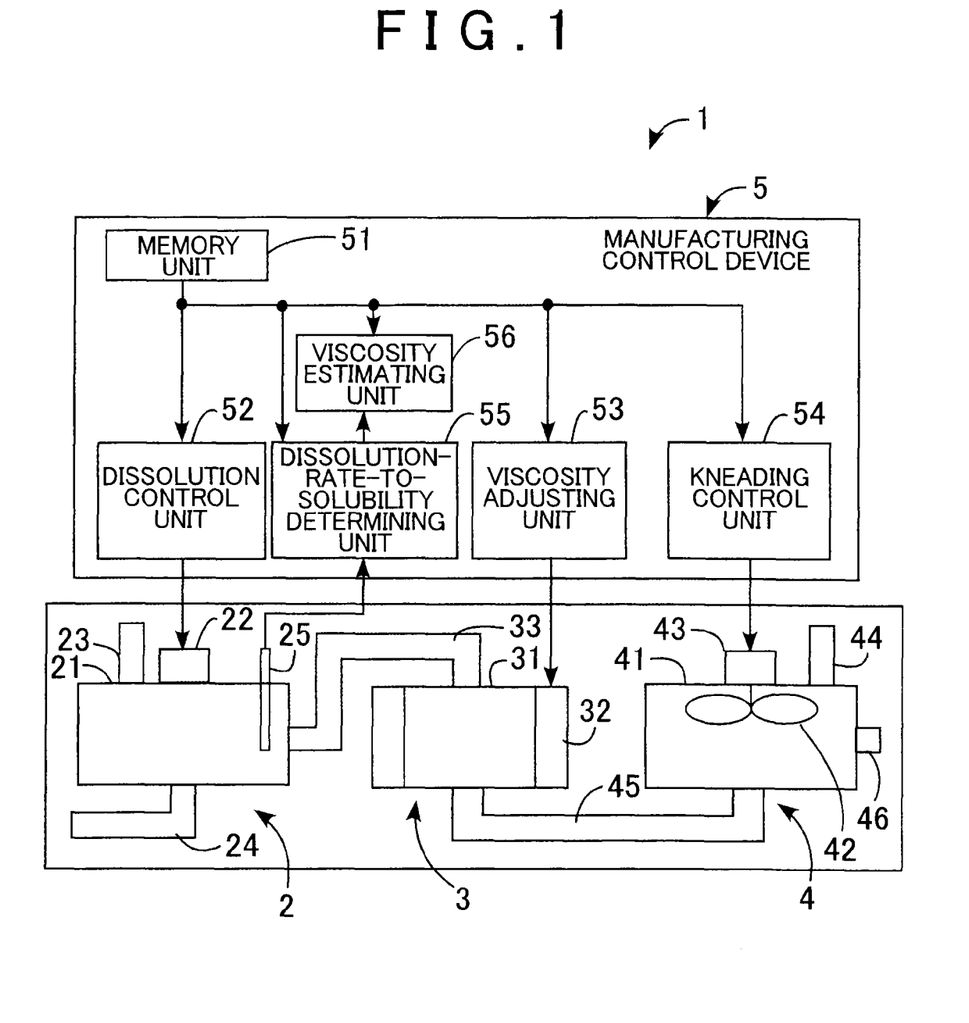
FIG. 1 is a schematic configuration diagram of an apparatus for manufacturing an electricity storage material according to an embodiment of the invention.

The configuration of the apparatus for manufacturing an electricity storage material according to the present embodiment will be described with reference to FIG. 1. An apparatus 1 for manufacturing an electricity storage material includes a dissolving device 2, a viscosity adjusting device 3, a kneading device 4, a manufacturing control device 5, etc.

The dissolving device 2 is a device that dissolves a thickener in a solvent to produce a solution. The dissolving device 2 includes a housing 21, a microwave device 22, a hopper 23, a supply pipe 24, a dissolution-rate-to-solubility determining device 25, etc. The housing 21 is formed in a hollow cylindrical shape. The microwave device 22 includes a magnetron, and is placed on the upper surface of the housing 21. The hopper 23 contains the thickener, and is provided so as to project from the upper surface of the housing 21 so that the thickener can be supplied into the housing 21. The supply pipe 24 is connected to the lower surface of the housing 21 so that the solvent can be supplied into the housing 21. The dissolution-rate-to-solubility determining device 25 includes a conductivity meter (conductivity measuring device), and is inserted into the housing 21 through the upper surface of the housing 21.

The viscosity adjusting device 3 is a device that adjusts viscosity of the solution produced by the dissolving device 2. The viscosity adjusting device 3 includes a housing 31, an ultrasonic device 32, an inlet pipe 33, etc. The housing 31 is formed in a hollow cylindrical shape. The ultrasonic device 32 is placed on the outer periphery of the housing 31 such that an ultrasonic wave generating element such as a piezoelectric element is in close contact with and is fixed to the outer peripheral surface of the housing 31. The inlet pipe 33 is placed between the outer peripheral wall of the housing 21 of the dissolving device 2 and the upper surface of the housing 31 so that the solution of the thickener contained in the housing 21 of the dissolving device 2 can be put into the housing 31.

The kneading device 4 is a device that kneads the solution of the thickener having the adjusted viscosity and an active material. The kneading device 4 includes a housing 41, stirring blades 42, a drive motor 43, a hopper 44, an inlet pipe 45, a drain pipe 46, etc. The housing 41 is formed in a hollow cylindrical shape. A rotary shaft for the stirring blades 42 is placed and supported on the central portion of the upper surface of the housing 41 so that the stirring blades 42 can rotate in the housing 41. The drive motor 43 is fixed to the upper surface of the housing 41, and a motor shaft of the drive motor 43 is coupled to the rotary shaft for the stirring blades 42.

The hopper 44 contains powder of the active material etc., and is provided so as to project from the upper surface of the housing 41 so that the powder of the active material etc. can be supplied into the housing 41. The inlet pipe 45 is placed between the lower surface of the housing 31 of the viscosity adjusting device 3 and the lower surface of the housing 41 so that the solution of the thickener contained in the housing 31 of the viscosity adjusting device 3 can be put into the housing 41. The drain pipe 46 is connected to the outer peripheral surface of the housing 41 so that slurry of an active material can be drained from the housing 41.

The manufacturing control device 5 includes a memory unit 51, a dissolution control unit 52, a viscosity adjusting unit 53, a kneading control unit 54, a dissolution-rate-to-solubility determining unit 55 (corresponding to the dissolution-rate-to-solubility determining device of the invention), a viscosity estimating unit 56 (corresponding to the viscosity estimating device of the invention), etc. The memory unit 51 has stored therein data showing the relation between the conductivity and the dissolution rate to solubility of the solution of the thickener (see FIG. 3), data showing the relation between the dissolution rate to solubility and the viscosity of the solution of the thickener (see FIG. 4), data showing the relation between the viscosity of the slurry of the active material and the viscosity of the solution of the thickener (see FIG. 6), data showing the relation between the time during which ultrasonic waves are applied and the viscosity of the solution of the thickener (see FIG. 7), and other data relating to dissolution control, viscosity adjustment, kneading control, etc.

The dissolution control unit 52 is a control unit that controls operation of the dissolving device 2. The dissolution control unit 52 produces the solution of the thickener by operating the microwave device 22 to generate microwaves, and applying the microwaves to the solvent supplied into the housing 21 to dissolve the thickener in the solvent. The dissolution-rate-to-solubility determining unit 55 determines the dissolution rate to solubility by measuring the conductivity of the solution of the thickener during dissolution of the thickener in the solvent. That is, the dissolution control unit 52 perform the control on dissolving the thickener by applying microwaves to the solvent for a predetermined time until it is determined by the dissolution-rate-to-solubility determining unit 55 that the thickener has been dissolved in the solvent at a dissolution rate to solubility of, e.g., 80% or more. The viscosity estimating unit 56 estimates the viscosity of the solution of the thickener based on the dissolution rate to solubility of the solution of the thickener determined by the dissolution-rate-to-solubility determining unit 55.

The viscosity adjusting unit 53 is a control unit that controls operation of the viscosity adjusting device 3. The viscosity adjusting unit 53 adjusts the viscosity of the solution of the thickener by operating the ultrasonic device 32 to generate ultrasonic waves, and applying the ultrasonic waves to the solution of the thickener supplied into the housing 31. That is, the viscosity adjusting unit 53 decides the viscosity of the solution of the thickener based on the final viscosity of the slurry of the active material, and controls viscosity adjustment by applying the ultrasonic waves for a predetermined time so that the solution of the thickener has the decided viscosity.

The kneading control unit 54 is a control unit that controls operation of the kneading device 4. The kneading control unit 54 produces the slurry of the active material by driving the drive motor 43 to rotate the stirring blades 42 and thus stirring the solution of the thickener, the active material, etc. which have been supplied into the housing 41. As described in detail below, the kneading control unit 54 sets a kneading index based on kinetic energy of particles of the active material, the mean free path of the particles of the active material, and a kneading time for the active material. The kneading control unit 54 sets kneading conditions so that the set kneading index is equal to or lower than a target value, and controls kneading of the active material according to the set kneading conditions.

Processing that is performed by the manufacturing control device 5 will be described below with reference to FIG. 2.

Figure 2:
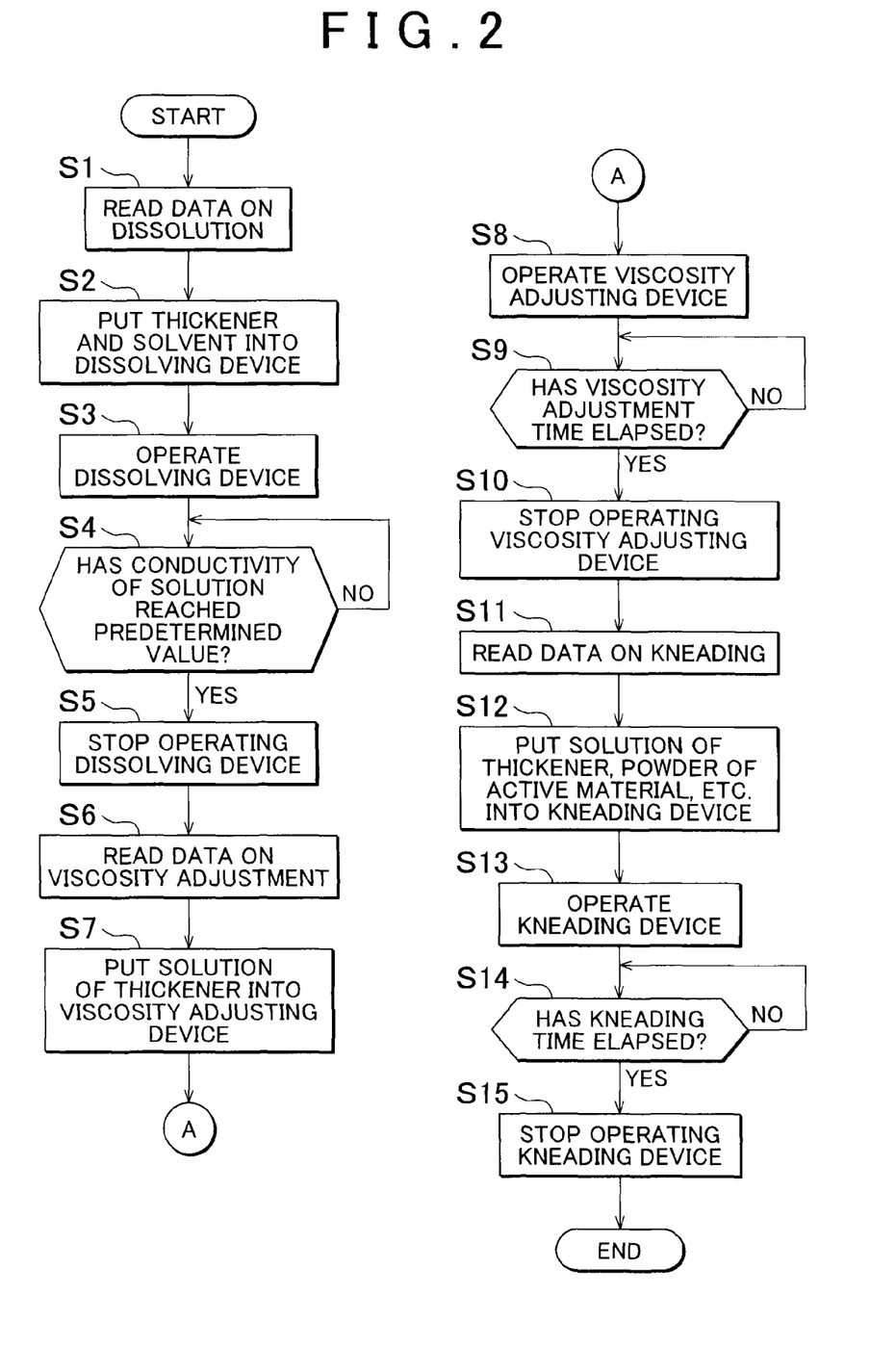
FIG. 2 is a flowchart illustrating processing that is performed by a manufacturing control device of the apparatus for manufacturing an electricity storage material according to the embodiment of the invention.

As shown in FIG. 2, the manufacturing control device 5 reads data relating to dissolution of the thickener (step S1), and puts the thickener and the solvent into the dissolving device 2 (step S2). The manufacturing control device 5 operates the dissolving device 2 (step S3), and determines whether the dissolution rate to solubility of the solution of the thickener has become equal to or more than, e.g., 80% or not based on whether the conductivity of the solution of the thickener has reached a predetermined value or not (step S4). The manufacturing control device 5 stops operating the dissolving device 2 if the conductivity of the solution of the thickener has reached the predetermined value (step S5).

Figure 3:
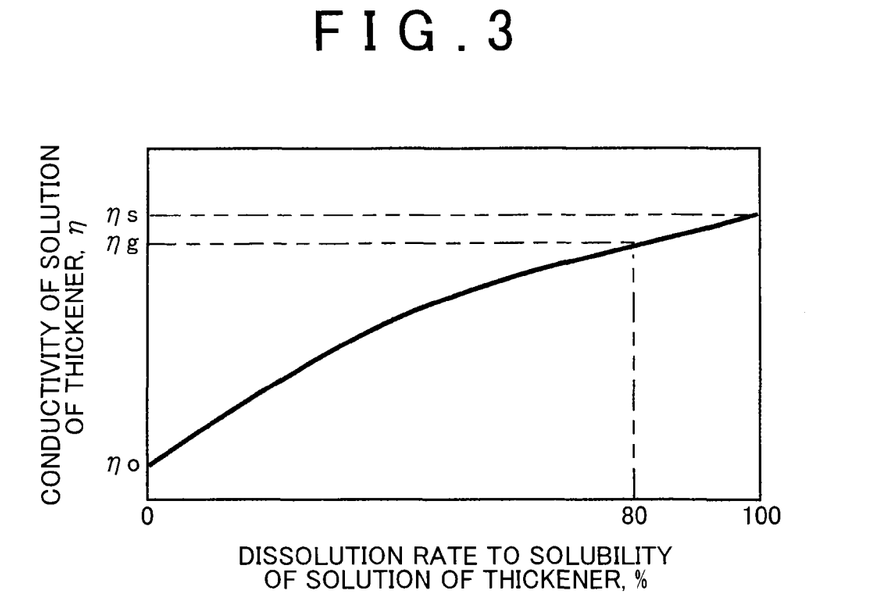
FIG. 3 is a diagram showing the relation between the conductivity of a solution of a thickener and the dissolution rate to solubility of the solution of the thickener.

Specifically, the dissolution control unit 52 reads from the memory unit 51 data on the mass of the thickener and the mass of the solvent and data showing the relation between the conductivity and the dissolution rate to solubility of the solution of the thickener. The dissolution control unit 52 puts a predetermined amount of thickener into the housing 21 through the hopper 23, and puts a predetermined amount of solvent into the housing 21 through the supply pipe 24. The dissolution control unit 52 operates the microwave device 22 to apply microwaves to the solvent in the housing 21 to dissolve the thickener therein. The dissolution-rate-to-solubility determining unit 55 measures the conductivity of the solution of the thickener with the dissolution-rate-to-solubility determining device 25 to determine the dissolution rate to solubility of the solution of the thickener. As shown in FIG. 3, the dissolution control unit 52 stops operating the microwave device 22 if it is determined by the dissolution-rate-to-solubility determining unit 55 that the conductivity of the solution of the thickener has become equal to or larger than a conductivity determination value $\eta g$ and the dissolution rate to solubility of the solution of the thickener has become equal to or more than, e.g., 80%.

Dissolution of the thickener in the solvent will be described. As shown in FIG. 3, "$\eta o$" represents the conductivity of the solution of the thickener immediately after the thickener is added to the solvent, i.e., at the time the thickener has not been dissolved in the solvent. Namely, "$\eta o$" represents the conductivity of the solution of the thickener at the time the dissolution rate to solubility is 0%. If the dissolution rate to solubility increases to 80%, the conductivity $\eta$ of the solution of the thickener increases to the conductivity determination value $\eta g$ ($>\eta o$). If the thickener has been dissolved in the solvent to saturation, that is, if the dissolution rate to solubility increases to 100%, the conductivity $\eta$ of the solution of the thickener increases to $\eta s$ ($>\eta g$). Accordingly, the dissolution rate to solubility of the solution of the thickener can be determined by monitoring the conductivity of the solution of the thickener. The dissolution rate to solubility of the solution of the thickener can thus be determined without the need to stop the dissolving device 2 during dissolution of the thickener in the liquid solvent. That is, the dissolution rate to solubility of the solution of the thickener can be determined while operating the dissolving device 2. This can significantly improve production efficiency. Since excessive operation of the dissolving device 2 can be prevented, energy saving can be achieved.

Determination of the dissolution rate to solubility of the solution of the thickener can be applied to the case of dissolving in a liquid solvent a powder thickener that is ionized when dissolved. For example, in the case of using water as a solvent, the water does not conduct electricity as the water itself has no ions. However, if carboxymethyl cellulose is added as a thickener, carboxymethyl cellulose is ionized and dissolved in the water, and the resultant solution conducts electricity. The conductivity therefore changes according to the dissolution rate to solubility of the solution of carboxymethyl cellulose in the water. Accordingly, the dissolution rate to solubility of the solution of the thickener in the solvent can be determined by monitoring the conductivity of the solution of the thickener.

Figure 4:
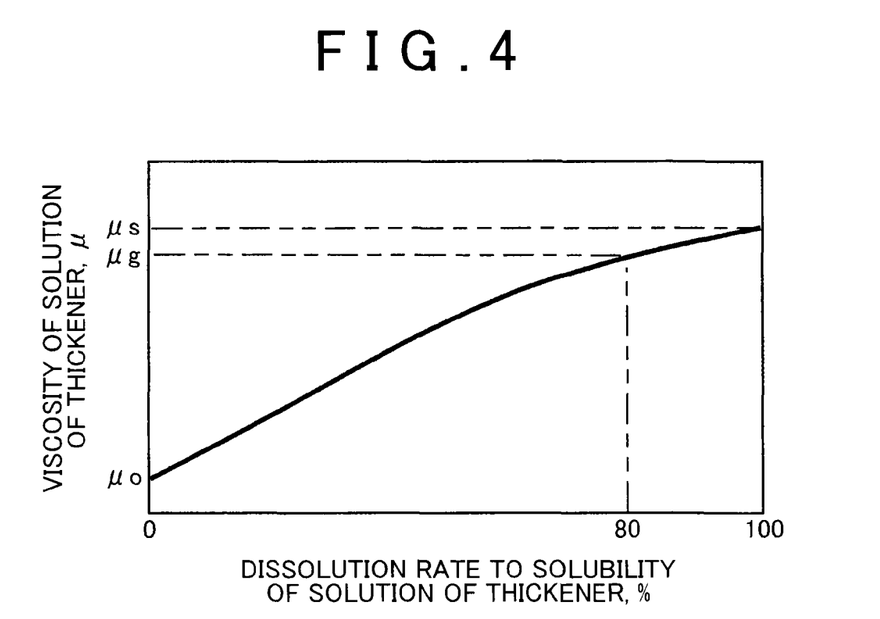
FIG. 4 is a diagram showing the relation between the viscosity of the solution of the thickener and the dissolution rate to solubility of the solution of the thickener.

As shown in FIG. 4, "$\mu o$" represents the viscosity of the solution of the thickener immediately after the thickener is added to the solvent, i.e., at the time the thickener has not been dissolved in the solvent. Namely, "$\mu o$" represents the viscosity of the solution of the thickener at the time the dissolution rate to solubility is 0%. If the dissolution rate to solubility increases to 80%, the viscosity $\mu$ of the solution of the thickener increases to $\mu g$ ($>\mu o$). If the thickener has been dissolved in the solvent to saturation, that is, if the dissolution rate to solubility increases to 100%, the viscosity $\mu$ of the solution increases to $\mu s$ ($>\mu g$). The viscosity of the solution of the thickener can therefore be estimated based on the dissolution rate to solubility of the solution of the thickener. It can thus be determined whether the solution is a solution having proper viscosity with the thickener satisfactorily dissolved therein or not.

Figure 5:
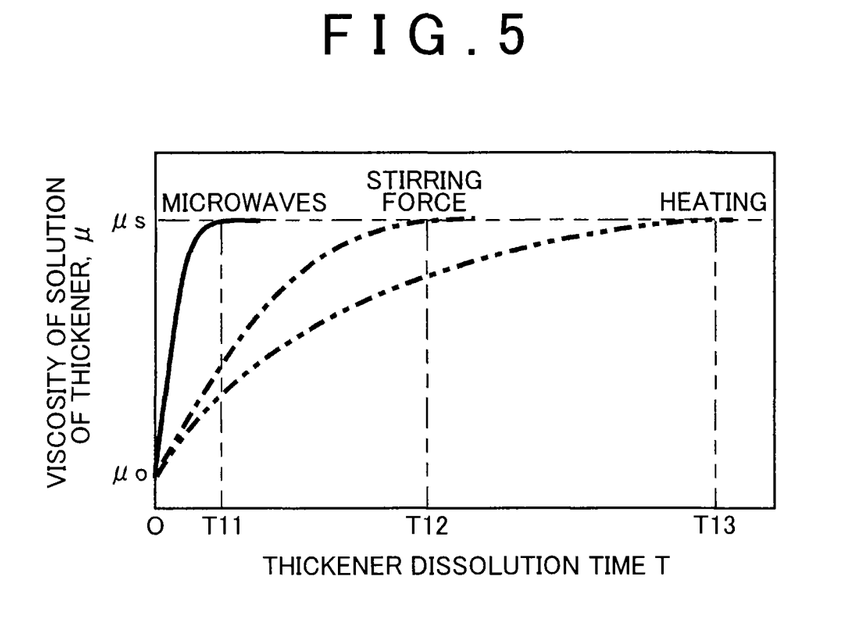
FIG. 5 is a diagram showing respective changes in viscosity of the solution of the thickener with time in the case of dissolving the thickener by using microwaves, a stirring force, and heating.

The thickener may be dissolved in the solvent by stirring as in conventional examples. In the present embodiment, however, the thickener is dissolved in the solvent by vibrating the solvent molecules by microwaves. This is because the thickener can be more efficiently dissolved in the solvent by the dissolving method using microwave vibrations than by a dissolving method using a stirring force or a dissolving method using heating of the solvent, as shown in FIG. 5. That is, the time T required to adjust the viscosity $\mu$ of the solution of the thickener to $\mu s$ as the viscosity at the time the thickener has been dissolved in the solvent to saturation (the thickener dissolution time T) is T12 in the case of using a stirring force, and T13 ($>$T12) in the case of heating the solvent. However, the use of microwaves can reduce the thickener dissolution time T to T11 ($<$T12$<$T13). The dissolution using microwaves thus reduces the time required, and therefore requires less electric power than the dissolution using a stirring force.

Dissolution using microwaves is performed by vibrating solvent molecules by microwave radiation to cause the solvent to penetrate the thickener. A desirable frequency band of the microwaves is a frequency band in which the solvent easily absorbs energy of the microwaves. For example, a frequency band from 0.9 GHz to 400 GHz is used in the case of using water as the solvent.

The manufacturing control device 5 then reads data relating to viscosity adjustment (step S6), and puts the solution of the thickener into the viscosity adjusting device 3 (step S7). The manufacturing control device 5 operates the viscosity adjusting device 3 (step S8), and determines whether a predetermined viscosity adjustment time has elapsed or not (step S9). If the predetermined viscosity adjustment time has elapsed, the manufacturing control device 5 stops operating the viscosity adjusting device 3 (step S10). Specifically, the viscosity adjusting unit 53 puts the solution of the thickener contained in the housing 21 of the dissolving device 2 into the housing 31 through the inlet pipe 33. The manufacturing control device 5 operates the ultrasonic device 32 to apply ultrasonic waves to the solution of the thickener in the housing 31 for the predetermined viscosity adjustment time.

Figure 6:
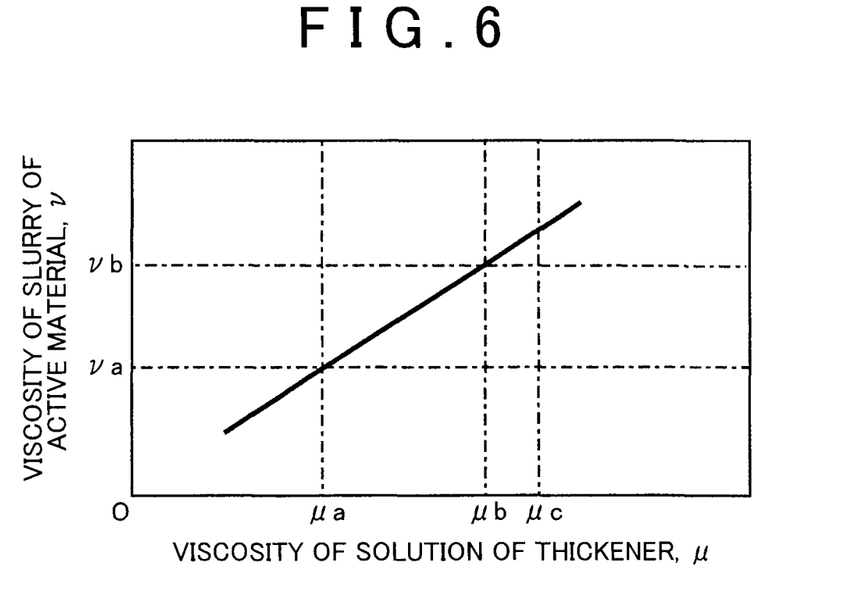
FIG. 6 is a diagram showing the relation between the final viscosity of slurry of an active material and the viscosity of the solution of the thickener.

Viscosity adjustment of the solution of the thickener will be described. As shown in FIG. 6, the final viscosity $\nu$ of the slurry of the active material is proportional to the viscosity $\mu$ of the solution of the thickener. The viscosity $\nu$ of the slurry of the active material can therefore be adjusted to a predetermined range of va to vb by adjusting the viscosity μ of the solution of the thickener to a predetermined value. The predetermined range of va to vb can be decided based on the balance between the initial battery performance and the time required to perform the steps of applying and drying the slurry.

The viscosity μ of the solution of the thickener is adjusted to a predetermined viscosity range of μa to μb shown in FIG. 6, or is adjusted to a value μc that is higher than the upper limit μb of the predetermined viscosity range by a predetermined value. The viscosity adjustment time required to knead the solution of the thickener and the powder of the active material etc. to obtain the final viscosity of the slurry of the active material can be reduced by adjusting the viscosity μ of the solution of the thickener to the predetermined viscosity range of μa to μb, which is close to the final viscosity of the slurry of the active material. The time during which the active material is subjected to a shear force is therefore reduced, which can reduce damage to the active material. Even if the viscosity μ of the solution of the thickener is the value μc that is higher than the upper limit μb by the predetermined value, the viscosity μ of the solution of the thickener can be adjusted to the predetermined viscosity range of μa to μb by adding the solvent afterward.

Figure 7:
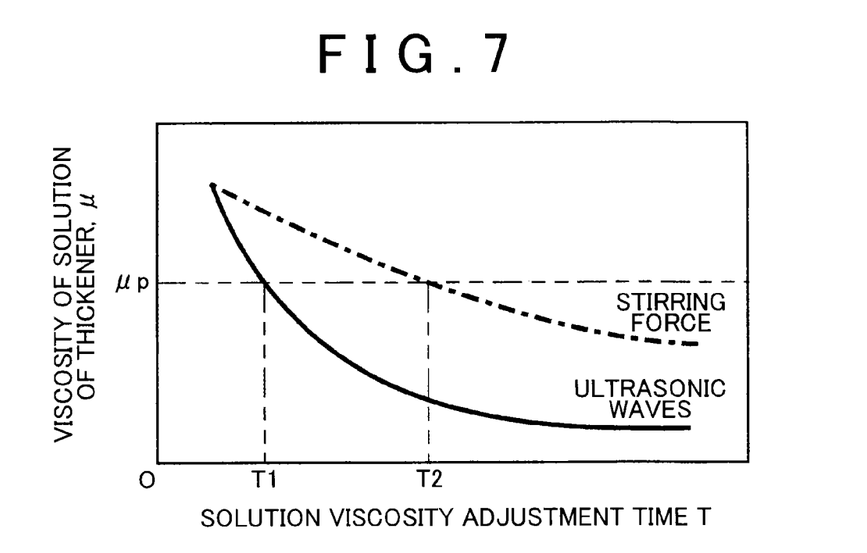
FIG. 7 is a diagram showing respective changes in viscosity of the solution of the thickener with time in the case of performing viscosity adjustment by using ultrasonic waves and a stirring force, respectively.

The viscosity adjustment of the solution of the thickener may be performed by cutting the molecular chains of the thickener with shear energy generated by a stirring force as in conventional examples. In the present embodiment, however, the viscosity adjustment is performed by cutting the molecular chains of the thickener with collision energy and shear energy which are generated by ultrasonic waves. This is because the viscosity of the solution of the thickener can be adjusted more quickly and more efficiently by using ultrasonic waves than by using a stirring force, as shown in FIG. 7.

That is, the time T required to adjust the viscosity μ of the solution of the thickener to viscosity μp as a target value (the viscosity adjustment time T) is T2 in the case of using a stirring force. However, the use of ultrasonic waves can reduce the viscosity adjustment time T to T1 (<T2). The viscosity adjustment using ultrasonic waves thus reduces the time required, and therefore requires less electric power than the viscosity adjustment using a stirring force. The viscosity μ of the solution of the thickener decreases with an increase in viscosity adjustment time T, and finally becomes the viscosity of water.

As shown in FIG. 2, the manufacturing control device 5 then reads data relating to kneading of the solution of the thickener, the powder of the active material, etc. (steps S11), and puts the solution of the thickener, the powder of the active material, etc. into the kneading device 4 (step S12). The manufacturing control device 5 operates the kneading device 4 (step S13), and determines whether a predetermined kneading time has elapsed or not (step S14). If the predetermined kneading time has elapsed, the manufacturing control device 5 stops operating the kneading device 4 (step S15), thereby producing final slurry of the active material.

Specifically, the kneading control unit 54 reads from the memory unit 51 data on the mass of the solution of the thickener, the mass of the powder of the active material, etc. and data on the kneading time. The kneading control unit 54 puts a predetermined amount of the powder of the active material etc. into the housing 41 through the hopper 44, and also puts a predetermined amount of the solution of the thickener into the housing 41 through the inlet pipe 45. The kneading control unit 54 drives the drive motor 43 to rotate the stirring blades 42 for the predetermined kneading time.

Figure 8:
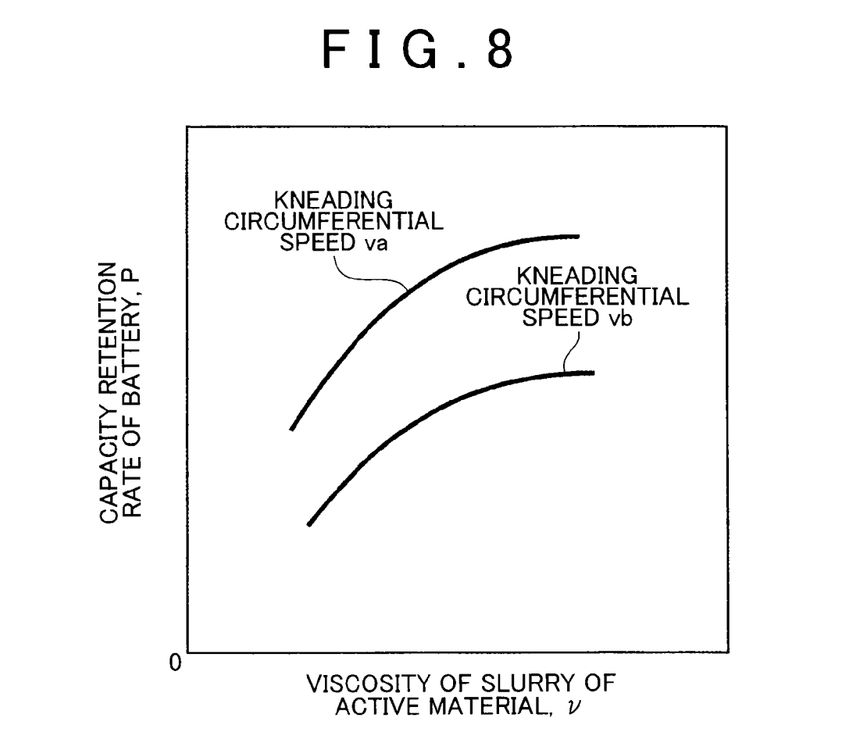
FIG. 8 is a diagram showing the relation between the capacity retention rate of a battery, i.e., durability (charge-discharge repeating characteristics) of the battery and the viscosity of the slurry of the active material.

Setting of the kneading index and the kneading conditions will be described. As shown by the experimental result of FIG. 8, the capacity retention rate P of the battery, i.e., durability (charge-discharge repeating characteristics) of the battery, increases as the viscosity v of the slurry of the active material increases. However, increasing the kneading circumferential speed v of the stirring blades 42 of the kneading device 4 (va<vb) reduces the capacity retention rate P of the battery even if the kneading is performed to the same viscosity v of the slurry of the active material. As the kneading circumferential speed v of the stirring blades 42 increases, the particles of the active material collide with the stirring blades 42 more frequently during kneading, and therefore have a higher probability of being damaged. If the particles of the active material are damaged and broken into smaller particles, the overall surface area of the particles is increased, and decomposition of the electrolyte is facilitated. The capacity retention rate P of the battery is thus significantly associated with damage to the particles of the active material.

Factors in the damage to the particles of the active material include the kneading time t for the active material and the solid content rate (solid content/(solid content+ liquid content)) η of the active material in addition to the kneading circumferential speed v of the stirring blades 42. Accordingly, the number of collisions of the particles of the active material is obtained based on a known mean free path by using a model of the particles of the active material which move freely in a predetermined space. As given by the following formula (1), cumulative collision energy D of the particles of the active material as the kneading index can be obtained by multiplying the kinetic energy $mv^2/2$ of the particles of the active material, the number of collisions $\sqrt{2} \cdot \eta \cdot \sigma \cdot v$ of the particles of the active material, and the kneading time t for the active material. The damage state of the particles of the active material due to kneading can thus be predicted before the kneading process.

$$D = \left(\frac{mv^2}{2}\right) \times \left(\sqrt{2}\, \eta \sigma v\right) \times (t) \quad (1)$$

where "D" represents the cumulative collision energy of the particles of the active material, "m" represents the weight of a single particle of the active material, "v" represents the kneading circumferential speed of the stirring blades, "η" represents the solid content rate of the active material, "σ" represents the mean particle size of the particles of the active material, and "t" represents the kneading time for the active material.

Figure 9:
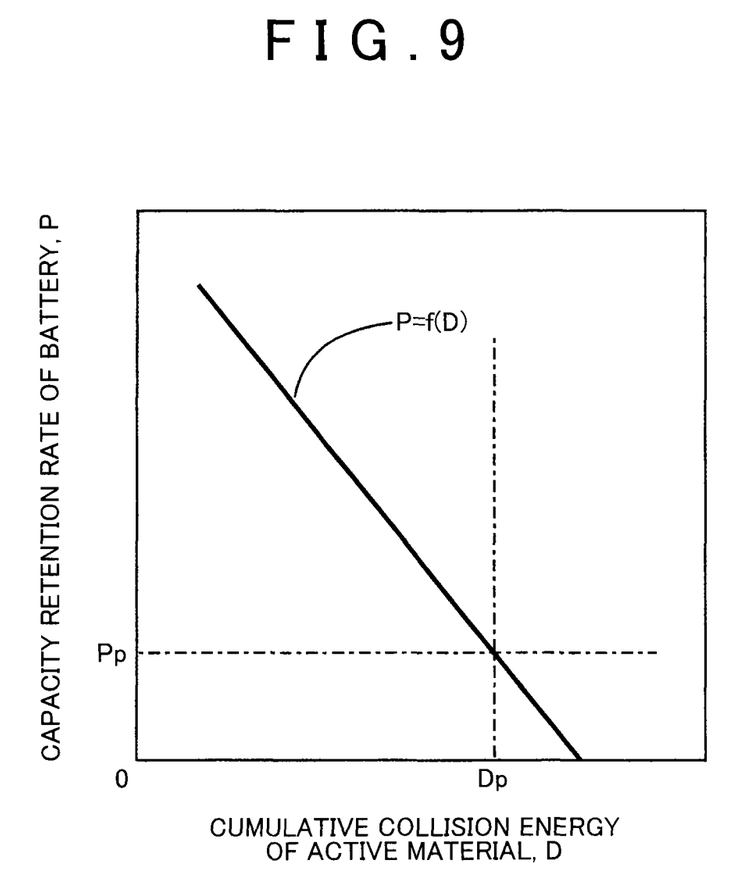
FIG. 9 is a diagram showing the relation between the capacity retention rate of the battery and the cumulative collision energy of the active material.

The relation between the capacity retention rate P of the battery and the cumulative collision energy D of the active material is obtained as shown in FIG. 9. This relation is obtained by adjusting the kneading circumferential speed v of the stirring blades, the solid content rate η of the active material, and the kneading time t for the active material which are the factors in the damage to the particles of the active material. The relational expression P=f(D) is obtained, and cumulative collision energy Dp of the active material which corresponds to a minimum required capacity retention rate Pp of the battery is obtained. Kneading conditions are set so that the cumulative collision energy of the active material becomes equal to or lower than Dp. That is, the kneading circumferential speed v of the stirring blades, the solid content rate η of the active material, and the kneading time t for the active material are set so that the cumulative collision energy of the active material is equal to or lower than Dp. The solid content rate is adjusted by changing the rate of the solid content to the liquid content.

The number of collisions of the particles of the active material was obtained based on the mean free path of the particles of the active material by using the model of the particles of the active material which move freely in a predetermined space, as described above. The cumulative collision energy of the active material can be obtained by multiplying the number of collisions of the particles of the active material, the kinetic energy of the active material, and the kneading time of the active material, and the cumulative collision energy thus obtained can be used as an index of durability of the battery. Since the damage state of the particles of the active material due to kneading can be predicted before actual kneading, kneading can be performed such that the particles of the active material are less likely to be damaged. A durable battery can therefore be manufactured.

The apparatus 1 for manufacturing an electricity storage material has the following advantageous effects. Conventionally, a thickener, a solvent, powder of an active material etc. are put into a kneading device at a time and stirred. Dissolution of the thickener, dispersion of the powder of the active material etc., and adjustment of the viscosity of the solution are thus performed by a single kneading device. Since the active material is subjected to a shear force for a long time, the active material can be damaged. In the present embodiment, however, dissolution of the thickener, dispersion of the powder of the active material etc., and adjustment of the viscosity of the solution are performed by separate devices, namely by the dissolving device 2 that dissolves the thickener in the solvent, the viscosity adjusting device 3 that adjusts the viscosity of the solution of the thickener, and the kneading device 4 that disperses the powder of the active material etc. in the solution of the thickener having the adjusted viscosity and kneads the powder of the active material etc. and the solution of the thickener. This reduces the time during which the active material is subjected to a shear force, and thus can suppress damage to the active material. A durable battery can therefore be manufactured. Moreover, since dissolution of the thickener, adjustment of the viscosity of the solution of the thickener, and dispersion and kneading of the powder of the active material etc., which especially take time to perform, can be performed simultaneously, production efficiency can be improved as compared to conventional examples.

The above embodiment is described with respect to the apparatus 1 for manufacturing an electricity storage material which includes the dissolving device 2 having the microwave device 22, and the viscosity adjusting device 3 having the ultrasonic device 32. However, the dissolving device 2 may be replaced with a dissolving device having stirring blades, or the viscosity adjusting device 3 may be replaced with a viscosity adjusting device having stirring blades. The apparatus for manufacturing an electricity storage material according to the invention may perform both dissolution and viscosity adjustment by a single device. The above embodiment is described with respect to the kneading device 4 including the stirring blades 42. However, the kneading device may include a screw instead of the stirring blades 42.

The above embodiment is described with respect to the case of manufacturing the active material for negative electrodes of lithium ion secondary batteries. However, the invention may also be applicable to the case of manufacturing an active material for positive electrodes of lithium ion secondary batteries. In this case, microwaves are applied when a binder such as polyvinylidene fluoride is dissolved in a solvent such as N-methylpyrrolidone. However, no ultrasonic waves are applied in the case where a conductive agent such as acetylene black is mixed with the solution in the dissolving step. This is because the viscosity of the solution can be adjusted according to the amount of conductive agent such as acetylene black to be mixed. The electricity storage material to which the invention is applied is not limited to the active material for electrodes of lithium ion secondary batteries. The invention is also applicable to any electricity storage materials such as, e.g., materials for capacitors.

What is claimed is:

1. An apparatus for manufacturing an electricity storage material containing at least a thickener and an active material, comprising:
   a dissolving device that dissolves a powder into a liquid solvent of the electricity storage material as the thickener, the powder being ionized when dissolved; and
   a dissolution-rate-to-solubility determining device including a conductivity meter inserted into a liquid solution of the thickener dissolved by the dissolving device, and configured to measure a conductivity of the liquid solution of the thickener and to determine a dissolution rate to solubility of the liquid solution of the thickener based on the measured conductivity.

2. The apparatus for manufacturing an electricity storage material containing at least a thickener and an active material according to claim 1, further comprising:
   a viscosity estimating device that estimates viscosity of the liquid solution of the thickener based on the dissolution rate to solubility of the liquid solution of the thickener determined by the dissolution-rate-to-solubility determining device.

3. The apparatus for manufacturing an electricity storage material containing at least a thickener and an active material according to claim 1, further comprising:
   a viscosity adjusting device that adjusts viscosity of the liquid solution of the thickener; and
   a kneading device that kneads the liquid solution of the thickener having the adjusted viscosity and the active material.

4. The apparatus for manufacturing an electricity storage material containing at least a thickener and an active material according to claim 2, further comprising:
   a viscosity adjusting device that adjusts viscosity of the liquid solution of the thickener; and
   a kneading device that kneads the liquid solution of the thickener having the adjusted viscosity and the active material.

5. The apparatus for manufacturing an electricity storage material containing at least a thickener and an active material according to claim 1, wherein,
   the dissolution-rate-to-solubility determining device is connected to a memory which stores the conductivity of the solution of the thickener during dissolution of the thickener in the solvent by the dissolving device.

6. The apparatus for manufacturing an electricity storage material containing at least a thickener and an active material according to claim 2, wherein,
   the dissolution-rate-to-solubility determining device is connected to a memory which stores the conductivity of the solution of the thickener during dissolution of the thickener in the solvent by the dissolving device.

7. The apparatus for manufacturing an electricity storage material containing at least a thickener and an active material according to claim 3, wherein, the dissolution-rate-to-solubility determining device is connected to a memory which stores the conductivity of the solution of the thickener during dissolution of the thickener in the solvent by the dissolving device.

8. The apparatus for manufacturing an electricity storage material containing at least a thickener and an active material according to claim 4, wherein, the dissolution-rate-to-solubility determining device is connected to a memory which stores the conductivity of the solution of the thickener during dissolution of the thickener in the solvent by the dissolving device.

\* \* \* \* \*